United States Patent [19]

Lacy et al.

[11] 4,428,424
[45] Jan. 31, 1984

[54] METHOD OF IMPROVING OIL/WATER PRODUCTION RATIO

[75] Inventors: James P. Lacy, Midland; Edmond L. Bailey, Andrews, both of Tex.

[73] Assignee: Waterchek, Inc., Midland, Tex.

[21] Appl. No.: 387,326

[22] Filed: Jun. 11, 1982

[51] Int. Cl.³ ............... E21B 33/138; E21B 47/06
[52] U.S. Cl. ................... 166/253; 166/292; 166/300
[58] Field of Search ............. 166/250, 253, 270, 281, 166/292, 300, 307

[56] References Cited

U.S. PATENT DOCUMENTS

| | | |
|---|---|---|
| 2,090,626 | 8/1937 | Grebe . |
| 2,208,766 | 7/1940 | Lawton .................. 166/292 |
| 2,265,962 | 12/1941 | Bent et al. . |
| 2,747,670 | 5/1956 | King et al. ............ 166/292 X |
| 2,807,324 | 9/1957 | King et al. .............. 166/292 |
| 2,816,610 | 12/1957 | Fisher . |
| 3,055,426 | 9/1962 | Kerver et al. . |
| 3,070,161 | 12/1962 | Kerver et al. . |
| 3,122,204 | 2/1964 | Oakes . |
| 3,202,214 | 8/1965 | McLaughlin, Jr. .......... 166/292 |
| 3,342,262 | 9/1967 | King et al. ............ 166/300 X |
| 3,508,613 | 4/1970 | Huff et al. .............. 166/307 |
| 3,578,085 | 5/1971 | Halbert ................. 166/307 |
| 3,593,796 | 7/1971 | Stainback et al. ...... 166/292 X |
| 3,701,384 | 10/1972 | Routson et al. ........ 166/281 X |
| 3,709,299 | 1/1973 | Suman, Jr. et al. ..... 166/292 X |
| 3,741,307 | 6/1973 | Sandiford ............. 166/300 X |
| 3,749,174 | 7/1973 | Friedman et al. ...... 166/281 X |
| 3,814,187 | 6/1974 | Holman ................. 166/281 |
| 3,876,007 | 4/1975 | Christopher ............ 166/307 |
| 4,004,639 | 1/1977 | Sandiford .............. 166/292 |
| 4,031,958 | 6/1977 | Sandiford et al. .... 166/292 X |
| 4,215,001 | 7/1980 | Elphingstone et al. .. 166/307 X |
| 4,231,882 | 11/1980 | Elphingstone et al. .... 166/307 |

Primary Examiner—Stephen J. Novosad
Assistant Examiner—George A. Suchfield
Attorney, Agent, or Firm—Marcus L. Bates

[57] ABSTRACT

A method of treating a hydrocarbon producing formation located downhole in a borehole, where the borehole has been cased and subsequently perforated, and the formation produces excessive water and an inadequate quantity of hydrocarbons through the perforations. Salt water is forced to flow down a tubing string, through the perforations, and out into the payzone. Thereafter, a spacer of fresh water follows the salt water, and thereafter a soluble alkali silicate solution flows behind the fresh water. Another spacer fluid of fresh water is forced to flow behind the silicate, followed by dilute acid. Next, the acid is displaced from the borehole and is forced out into the formation with flushing fluid, and the wellbore is then produced. The flow of the recited material through the perforations follows along the path of least resistance, which also is the flow path of the water intrusion. The salt water and silicate react with one another to form a barrier which prevents the water from invading the formation. The acid reacts with any of the remaining silicate and assures that the silicate has been precipitated from solution to form the barrier.

18 Claims, 4 Drawing Figures

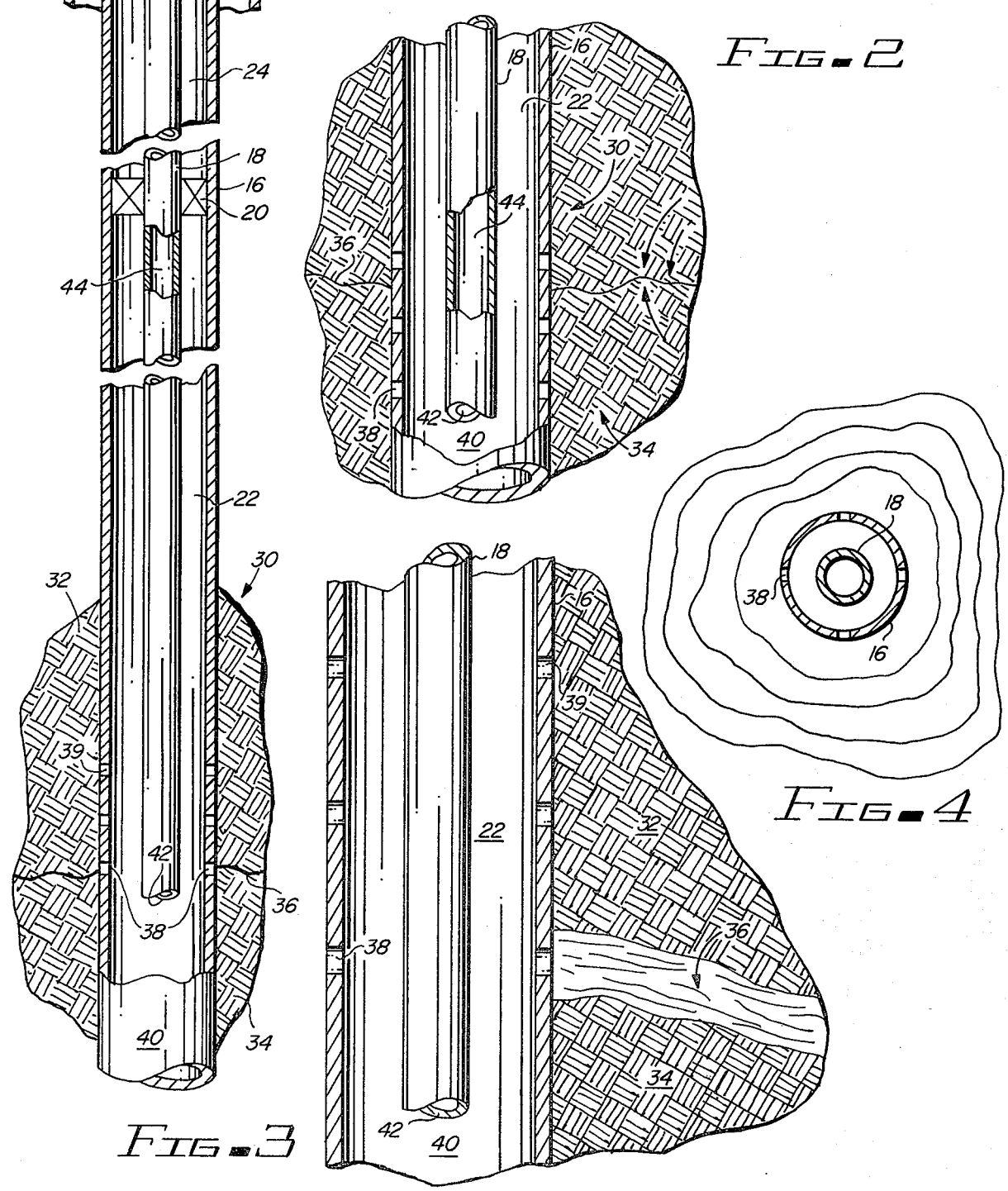

METHOD OF IMPROVING OIL/WATER PRODUCTION RATIO

BACKGROUND OF THE INVENTION

There are many marginal oil wells which fail to produce a sufficient quantity of hydrocarbons to justify the continued expense of operation thereof. Once upon a time, most of these wells were considered good producers, especially when the wells were first completed; but over the years the hydrocarbon production declined until the wells no longer were considered economical to continue operation thereof. Usually the decline of hydrocarbon production is accomplished by a progressively increasing production of water. Often the water/oil production ratio will attain a value, for example, of two hundred barrels of water to twelve barrels of oil.

At other times, water production may remain fairly constant while the hydrocarbon production rate simply declines to an unacceptable value, which causes the operator to consider shutting the well in and salvaging the equipment therefrom.

Prior to abandoning the well, the operator will usually attempt to stimulate the well, as for example, a fracturing and acidizing process may be carried out on the old borehole. Occasionally the well fails to favorably respond to the fracturing treatment, and instead the well becomes a producer of excessive water, so that the operator now has a worthless well and an additional $75,000 to $100,000 investment in the stimulation treatment.

Therefore, it would be desirable to be able to isolate the water producing portion of a payzone so that the water/oil production rate is favorably improved, thereby avoiding the expense of producing water, as well as avoiding the expense of water disposal. A process which achieves this desirable goal is the subject of the present invention.

SUMMARY OF THE INVENTION

This invention comprehends a method of treating a hydrocarbon producing formation located downhole in a borehole, wherein the borehole has been cased, the casing has been perforated, and the formation produces excessive water along with the hydrocarbons. The process is carried out by flowing salt water along an isolated flow path which extends downhole through the perforations, and out into the formation. The salt water is followed by a spacer comprised of a small quantity of fresh water, and thereafter, a soluble alkali silicate solution is flowed behind the spacer fluid. The fresh water prevents the salt water from reacting with the silicate until the silicate has been forced through the perforations and out into the formation. The salt water and silicate flow out into the formation and react together to form a barrier, or blanket, which essentially plugs the formation, or reduces the porosity of the formation to a value which prevents the intrusion of water into the hydrocarbon producing portion of the payzone.

The silicate solution preferably is a soluble alkali silicate solubilized with water, and particularly is sodium silicate, also known as water glass. The salt solution preferably is a 10% calcium chloride or sodium chloride and water solution.

In the preferred form of the invention, the silicate solution is followed by another spacer of water, which in turn is followed by a dilute acid. The dilute acid preferably is a 15% hydrochloric acid solution which is forced out into the formation where it instantly reacts with any of the remaining silicate solution to assure that the reaction has gone to completion.

The acid solution is displaced from the borehole and forced through the perforations using water, oil or brine. Several treatments or alternate slugs of silicate and salt solution can be flowed downhole prior to the acid in order to achieve a more dense barrier.

In a more specific embodiment of the invention, calcium chloride water is forced to flow downhole and into the formation. The salt solution is followed by a spacer solution, and then a sodium silicate solution and another spacer, and thereafter a smaller quantity of salt water is followed by another spacer solution which is forced down the borehole and out into the formation. Thereafter additional silicate solution is added, which is followed by another spacer, and then additional salt water is forced downhole and out into the formation. Thereafter, another spacer solution, additional silicate solution, and a displacing material is flowed downhole.

This action lays down several different layers of a gelatinous precipitant, which forms a barrier against water intrusion. Thereafter, 15% hydrochloric acid along with stabilizers and other additives are forced downhole and out into the formation to flash set any residual silicate. The acid is displaced out into the formation to cause the final setting of the silicate and to open the perforations of the formation so that the flow capacity of the producing interval is restored. The system is left dormant for several hours and then production is resumed.

Accordingly, a primary object of the present invention is the provision of a method by which the water/oil ratio of a producing oil well is economically improved.

Another object of the present invention is the provision of a method for blocking off water invasion of a payzone located downhole in a borehole.

A still further object of the present invention is the provision of a method by which a hydrocarbon producing formation located downhole in a borehole is treated to reduce the water produced by the well.

Another and still further object of the present invention is the provision of a method of treating a hydrocarbon producing formation located downhole in a borehole by forcing various different chemicals to continuously flow in series relationship respective to one another into the formation where the different chemicals react with one another to form a barrier, wherein the barrier reduces the production of water and enhances the production of hydrocarbons.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 1 is a part diagrammatical, part schematical, representation of a cross-sectional view which discloses a borehole having apparatus associated therewith for carrying out the method according to the present invention;

FIG. 2 is a fragmentary view of part of the borehole disclosed in FIG. 1;

FIG. 3 is an enlarged, fragmented view of part of the borehole disclosed in FIGS. 1 and 2; and, FIG. 4 is a cross-sectional view taken along line 4—4 of FIG. 1.

DETAILED DESCRIPTION OF THE PREFERRED EMBODIMENTS

In the figures of the drawings, there is disclosed an oil well 10 having the usual wellhead 12 which extends above the surface 14 of the ground. The oil well includes a borehole which is cased at 16. A tubing string 18 extends down through the longitudinal axial centerline of the borehole. A packer device 20 of known construction divides the casing annulus into a lower annular area 22 and an upper annular area 24. The uppermost end of the tubing is connected to a lateral flow pipe 26, while the uppermost end of the casing annulus is connected to a lateral flow pipe 28.

A hydrocarbon containing formation 30 has an upper portion 32 which predominantly produces oil, and a lower portion 34 which predominantly produces water; with there being an oil/water interface 36 formed between the stratum 32 and 34. Strata 32 is therefore a lower-water strata while strata 34 is a high-water strata. The casing is perforated in the usual manner and the perforations sometimes extend over more than 100 feet. The perforations include lowermost perforations 38 and uppermost perforations 39. The bottom 40 of the borehole is sometimes called the rathole. The lower terminal end 42 of the tubing string usually terminates about 100 feet above the top perforation for convenience, but can be set at any location desired above the perforations. The interior 44 of the tubing string forms part of an isolated flow path which extends from the surface of the earth, down to the perforated zone of the borehole.

Flow line 46 is connected to the schematically illustrated pump P, pressure gauge G, and to a valve 48. A plurality of valves 50 selectively control the flow of the treatment chemicals, fresh water, salt water, acid, and liquid glass into flow line 46. The treatment chemicals therefore can be forced under a selected pressure to flow along an isolated flow path down to the payzone 30 of a wellbore, with the flow path comprising piping 46, 26, 18, through outlet 42 into the perforations 38 and out into the payzone.

In FIG. 2 the water/oil interface 36 is seen to be located at a higher elevation respective to the perforations of the casing, as compared to FIG. 1, for example. In FIG. 3, the interface 36 has been modified in accordance with the present invention by a gelatinous precipitant which comes down when a solution of a soluble silicate is acidified, with the precipitant being described as a hydrous oxide $(SiO_2) \times (H_2O)y$.

Broadly the present invention is exemplified as follows: a high water strata 34 was found to be producing excess water through the perforations, along with a minimum of hydrocarbons from the low water strata 32. A tubing string 18 was therefore positioned with the outlet 42 thereof in proximity of perforations 38 so that treatment salt water could be forced through conduit 46 by pump P, down through the tubing string, and through perforations 38 out into the formation. The salt water flows along the path of least resistance, which is also the path followed by the intruding water. Next, the appropriate valve 50 was opened to cause a small quantity of fresh water to flow along flow path 46, 26, 44, 38 to thereby provide a spacer between the salt water and the liquid glass which is next forced down along the before described flow path and into the formation where the liquid glass admixes with and reacts with the salt water. The resultant reaction commences to form a blanket or barrier 36, FIG. 3, with the blanket or barrier preventing the intrusion of water from the high water strata 34 into the perforations. The liquid glass is followed by another spacer, and thereafter acid is pumped down the tubing string and out into the formation in order to flash set or completely react with all of the liquid glass located out in the formation. The acid is displaced from the tubing string by either fresh or brine water, in order to complete the reaction and to stimulate the hydrocarbon producing interval 32.

The liquid glass is maintained separated from the acid and the salt water by the spacer, because contact of the liquid glass with either the salt water or the acid within the wellbore will "set up" the liquid glass, and obstruct the flow within the borehole.

The liquid glass generally is a silicate, and more specifically a salt or ester of a silicic acid. More particularly, the silicate is the alkali-metal silicate which is water soluble. The preferred silicate of this invention is sodium silicate which is available as a syrupy liquid known as water glass, and which can be dried in cold air and mixed with an inexpensive water soluble free flowing agent, thereby making the silicate available in powdered form.

When the solution of the soluble silicate becomes acidified, a gelatinous precipitant comes down which is described as a hydrous oxide $(SiO_2) \times (H_2O)y$. This action occurs as the silicate and salt water solution meet out in the payzone, and as a result the silicate is set up into a solid or semi-solid and thereby forms a blanket which presents a barrier to the intrusion of water. The water therefore is precluded from flowing from the payzone into the wellbore.

The salt water preferably is a 10% solution of calcium chloride or 10 pounds brine solution. A 10% calcium chloride water solution or a 10 pound sodium chloride water solution is readily available in the oil patch and therefore this concentration is utilized although the invention could be practiced with a salt solution having as little as 5% solids dissolved therein, or if deemed desirable, the invention could be practiced with a saturated solution of salt water.

The spacer usually is fresh water because of its low cost and availability. However, crude oil, diesel fuel and other liquids which are inert to the brine, acid, and silicate solution can be advantageously employed as a spacer while practicing the method of the present invention.

The acid preferably is 15% non-emulsified, iron stabilized, hydrochloric acid. This concentration of treated acid is commercially available in the oil patch; however, the acid can be changed in concentration to a more dilute or a more concentrated acid with or without the mentioned additives; as for example 5%–28% acid. A 28% solution of hydrochloric acid is about the highest concentration one can effectively inhibit for oil field service work, and for this reason, a more acceptable standard acid solution which is readily available is preferred. Fifteen percent unemulsified, iron stabilized acid is commonly used for acidizing formations located downhole in boreholes and for this reason this concentration of hydrochloric acid is preferred. Other acids which suitably react with the silicate can also be employed.

In a more specific example of the present invention, fifty barrels of 10 pounds per gallon salt water followed by a spacer of 5 barrels of fresh water are pumped down the tubing string by means of pump P. One thousand gallons of sodium silicate, followed by 5 barrels of fresh water as a spacer, which in turn is followed by 25 barrels of 10 pounds salt water, followed by 5 barrels of fresh water as another spacer are pumped in series relationship respective to the before metnioned treatment chemicals. This last spacer is followed by another 1000 gallons of water glass which is followed by 5 barrels of fresh water as another spacer, and this is followed by 25 barrels of 10 pound salt solution, which in turn is followed by another spacer of 5 barrels of fresh water.

Then 1000 gallons of water glass was followed by a spacer of 3 barrels of fresh water which is followed by another 1000 gallons of 15% non-emulsified, iron stabilized hydrochloric acid. The acid was displaced out into the formation with fresh water or with one or two percent calcium chloride water, with there being over displacement practiced by utilizing an additional 6 barrels of fresh water, thereby assuring that the acid is spaced away from the casing.

While pumping the various treatment chemicals downhole, the pressure gauge in line 46 is monitored, with the surface pressure being maintained at approximately 700–1000 psig fracturing gradient. When the line pressure commences to rise at the surface, the flow rate of two barrels per minute is diminished to a lower value. By employment of approximately 700–1000 psig pressure at P, fracturing of the formation is avoided, and the high water zone accepts most of the treatment chemicals along interface 36, so that the reaction between the salt water and water glass occurs along the interface 36 and radially away from the well borehole. The acid is forced to flow along the same flow path followed by the salt water and water glass, and therefore flash sets or instantly reacts with all of the residual unreacted water glass. The fresh water behind the acid assures that the acid has been displaced from the metal parts of the borehole.

It is preferred to close the treated well in for several hours, and then commence swabbing, while very carefully keeping the rate of production very low until it is ascertained that a predominance of crude is being produced by the swabbing action. Usually, mostly crude will now be produced by the treated well, and the well can be placed back on production with the water/oil ratio being greatly improved, with the well being returned to service as an economical producer.

In the above example, the initial 50 barrels of salt water can be adjusted, as for example, 15–200 barrels, depending upon the characteristics of the reservoir. The amount of sodium silicate following the salt water treatment can also be adjusted to maintain a ratio of salt water/water glass which assures most of the water glass reacting with the salt water.

As the well treatment progresses, the pressure at G sometime will commence to increase thereby indicating that the water intrusion has been sealed off and therefore, the addition of water glass and brine can be terminated and the appropriate amount of acid can be pumped downhole behind a spacer in order to flash set any of the remaining water glass located out in the formation.

In some instances, the fracturing gradient will be considerably higher or lower, depending upon the characteristics of the formation, the propant employed, and the calculated width of the fracture.

In the first example above, it is possible to substitute additional salt water for the acid as well as substituting other acids for the hydrochloric acid. In the second example above, the alternant slugs of salt water and silicates can be discontinued anytime the surface pressure indicates that the interface has been suitably treated with the barrier material.

The process of the present invention returns an uneconomical well to economical service. The process saves many thousands of dollars in expense as compared to other remedial actions.

For example, in the prior art, in order to duplicate the present results, it is necessary to run cement downhole, squeeze the cement out into the perforations, drill out a retainer, reperforate, re-acidize, and thereafter, it is usually necessary to re-fracture because the fracture has been plugged off with cement. This costs in excess of $100,000.00, whereas, the present invention can be carried out for under $10,000.00.

In another example, a new well was completed and found to make 350 barrels of water with only a trace of crude production. The present invention was carried out on the well using salt water, fresh water spacers, water glass, and 15% hydrochloric acid as set forth in example 1.

The well was swabbed and no water was produced, and only a trace of oil was found. This is a strong indication that the original fracturing only occurred in the water zone 34. Therefore, the well must be fractured again, and if the barrier 36 holds, the new fractures will extend vertically upwards into the strata 32, and no fracturing will occur within the strata 34. The well can now be produced at its optimum capacity since the perforations are now communicated with the oil bearing strata 32 rather than with the water bearing strata 34.

We claim:

1. In a cased wellbore having perforations formed adjacent to a hydrocarbon producing formation thereof, wherein the formation produces excessive water through the perforations, the method of reducing the water production comprising the steps of:
    (1) flowing a first treatment fluid which includes a dilute salt solution comprised of NaCl and CaCl along an isolated flow path down into the borehole, through the perforations, and out into the formation;
    (2) flowing an inert spacer fluid behind the first treatment fluid;
    (3) flowing a second treatment fluid comprised of a solution of sodium silicate along said isolated flow path and out into the formation;
    (4) flowing an inert flushing fluid behind the silicate;
    (5) repeating steps (1-4) while monitoring the surface pressure until the surface pressure begins to rise;
    (6) flowing inert flushing into the borehole to flush the salt solution and the silicate solution from the borehole, out into the formation;
    (7) flowing dilute HCl acid downhole into the formation after carrying out step (6), and then repeating the step of flowing an inert flushing fluid down the isolated flow path to displace the acid from the borehole;
    (8) shutting in the wellbore until the silicate reacts with the acid and salt water to form a barrier in the form of a precipitant which prevents water flowing therethrough, and thereafter producing the wellbore.

2. The method of claim 1 and further including the step of using oil field brine water as the source of the NaCl and CaCl.

3. The method of claim 2 and further including the step of adjusting the brine salt content to a value of 5-15% and the HCl to a value of 10-20%.

4. A method of treating a hydrocarbon producing formation located downhole in a borehole, wherein the formation makes excessive water along with the hydrocarbons, comprising the steps of:
(1) flowing salt water along an isolated flow path, downhole and out into the formation; said salt water being selected from the group comprising NaCl and $CaCl_2$; and, thereafter;
(2) flowing a spacer fluid behind the salt water of step (1), said spacer fluid being inert respective to the salt water of step (1) and the soluble silicate of step (3); and, thereafter;
(3) flowing a soluble alkali silicate solution behind said spacer fluid and along said isolated flow path, and out into the formation; and thereafter displacing the silicate solution from the borehole by flowing another said spacer fluid behind the silicate solution; and,
(4) flowing dilute HCl downhole into the formation after carrying out step (3);
(5) shutting in the wellbore until the silicate reacts with the acid and salt water to form a barrier in the form of a precipitant which prevents water flowing therethrough, and thereafter producing the wellbore.

5. The method of claim 4 wherein the borehole is cased and the casing has been perforated adjacent the formation, and the following steps are included: extending a tubing string downhole with a packer device attached thereto; isolating the upper borehole annulus from the lower borehole annulus with the packer device; and, pumping the various recited fluids down the tubing string, into the lower borehole annulus, through the casing perforations, and out into the formation.

6. A method of treating a hydrocarbon producing formation located downhole in a borehole, wherein the borehole is cased, the casing has been perforated, and the formation makes excessive water along with the hydrocarbons, comprising the steps of:
(1) flowing salt water along an isolated flow path downhole, through the perforations, and out into the formation; said salt water includes a water soluble salt selected from the group comprising NaCl and $CaCl_2$;
(2) flowing a spacer fluid behind the salt water of step (1), said spacer fluid being inert respective to the salt water of step (1) and the soluble silicate of step (3);
(3) flowing a soluble alkali silicate solution behind said spacer fluid and along said isolated flow path, and out into the formation;
(4) displacing the silicate solution from the borehole by flowing a spacer fluid behind the silicate solution of step (3);
(5) flowing an acid solution containing HCl behind the spacer fluid of step (4);
(6) shutting in the wellbore until the silicate reacts with the acid and salt water to form a barrier in the form of a preciptant which prevents water flowing therethrough, and thereafter producing the wellbore.

7. The method of claim 6 wherein the isolated flow path of step (1) is formed by running a tubing string down the casing and positioning the end of the tubing string adjacent to the perforations, and,
placing a packer device between the tubing string and the casing at a location above the perforations.

8. The method of claim 6 wherein the salt water is selected from the group comprising NaCL and $CaCl_2$; and the acid is HCL.

9. The method of claim 6 wherein the salt water has a concentration of 5-15% salt solids; and the HCl is 5-28% concentration diluted with water.

10. The method of claim 6 wherein a second quantity of the silicate solution is forced downhole following step (4); and, another spacer fluid is flowed downhole prior to carrying out step (5).

11. The method of claim 6 wherein said soluble alkali silicate solution is sodium silicate.

12. The method of claim 6 wherein said soluble alkali silicate solution is water glass.

13. A method of treating a hydrocarbon producing formation located downhole in a borehole, wherein the borehole is cased, the casing has been perforated, and the formation makes excessive water along with the hydrocarbons, comprising the steps of:
(1) flowing salt water along an isolated flow path downhole, through the perforations, and out into the formation;
(2) flowing a spacer fluid behind the salt water of step (1), said spacer fluid being inert respective to the salt water of step (1) and the soluble silicate of step (3);
(3) flowing a soluble alkali silicate solution behind said spacer fluid and along said isolated flow path;
(4) flowing a spacer fluid behind the silicate solution of step (3);
(5) repeating steps (1), (2), and (3);
(6) flowing another spacer fluid downhole prior to carrying out step (7);
(7) flowing acid behind the spacer fluid of step (6); and,
(8) shutting in the wellbore until the silicate reacts with the acid and salt water to form a barrier in the form of a precipitant which prevents water flowing therethrough, and thereafter producing the wellbore.

14. The method of claim 13 wherein the isolated flow path of step (1) is formed by running a tubing string down the casing, and positioning the end of the tubing string adjacent to the perforations; and,
placing a packer device between the tubing string and the casing at a location above the perforations.

15. The method of claim 13 wherein said soluble alkali silicate solution is sodium silicate.

16. The method of claim 13 wherein said soluble alkali silicate solution is water glass.

17. A method of treating a hydrocarbon producing formation located downhole in a borehole, wherein the borehole is cased, the casing has been perforated, and the formation makes excessive water along with the hydrocarbons, comprising the steps of:
(1) attaching a packer device to a tubing string; extending the packer device downhole by using the tubing string; using the packer device for isolating the upper horehole annulus from the lower borehole annulus;

(2) flowing salt water down through the tubing string; through the perforations; and out into the formation; selecting said salt water from the group comprising NaCl and $CaCl_2$;
(3) flowing a spacer fluid behind the salt water of step (2), said spacer fluid being inert respective to the salt water of step (2) and the soluble silicate of step (4);
(4) flowing a soluble alkali silicate solution behind said spacer fluid and along said isolated flow path, and out into the formation;
(5) displacing the silicate solution from the borehole by flowing another spacer fluid downhole after carrying out step (4);
(6) flowing a solution of HCl acid behind the spacer fluid of step (5); and,
(7) shutting in the wellbore until the silicate reacts with the acid and salt water to form a barrier in the form of a precipitant which prevents water flowing therethrough, and thereafter producing the wellbore.

18. The method of claim 17 wherein the salt solution of step (2) is oil field brine water; and,
(7) another spacer fluid is flowed into the borehole after carrying out step (6);
(8) the well is shut in for a time interval of sufficient duration to enable the silicate of step (4) to react with the salt water and the acid;
(9) producing the formation after carrying out step (8).

* * * * *